(12) United States Patent
Okada

(10) Patent No.: US 11,025,189 B2
(45) Date of Patent: Jun. 1, 2021

(54) MOTOR CONTROL DEVICE

(71) Applicant: MITSUBA Corporation, Gunma (JP)

(72) Inventor: Hiroaki Okada, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 16/646,148

(22) PCT Filed: Nov. 19, 2018

(86) PCT No.: PCT/JP2018/042601
§ 371 (c)(1),
(2) Date: Mar. 11, 2020

(87) PCT Pub. No.: WO2019/111684
PCT Pub. Date: Jun. 13, 2019

(65) Prior Publication Data
US 2020/0274476 A1 Aug. 27, 2020

(30) Foreign Application Priority Data
Dec. 7, 2017 (JP) .............................. JP2017-235526

(51) Int. Cl.
H02P 25/098 (2016.01)
(52) U.S. Cl.
CPC .................................. H02P 25/098 (2016.02)
(58) Field of Classification Search
None
See application file for complete search history.

(56) References Cited

U.S. PATENT DOCUMENTS

| 5,440,218 A * | 8/1995 | Oldenkamp | ............ H02P 25/08 318/280 |
| 5,548,196 A * | 8/1996 | Lim | .................... H02P 25/0925 318/400.13 |
| 2002/0070701 A1* | 6/2002 | Disser | .................... B60T 13/74 318/701 |

(Continued)

FOREIGN PATENT DOCUMENTS

| JP | 2002058272 | 2/2002 |
| JP | 2015139350 | 7/2015 |
| JP | 2017192174 | 10/2017 |

OTHER PUBLICATIONS

"International Preliminary Report of Patentability (Form PCT/IB/373) of PCT/JP2018/042601", with English translation thereof, dated Jun. 18, 2020, pp. 1-13.

(Continued)

Primary Examiner — Bentsu Ro
(74) Attorney, Agent, or Firm — JCIPRNET

(57) ABSTRACT

The invention suppresses the generation of an excessive current in a SR motor during switching between drive control and brake control. This motor control device is for controlling rotation of a multiphase SR motor, and is provided with a control unit that controls the rotational speed of the SR motor while switching between drive control for generating drive torque in the SR motor and brake control for generating braking torque in the SR motor, wherein the control unit performs switching from the drive control to the brake control or vice versa under the condition that the current flowing through a winding wire of an energized phase is less than a prescribed value.

16 Claims, 7 Drawing Sheets

(56) References Cited

U.S. PATENT DOCUMENTS

2011/0148333 A1\* 6/2011 Umemori ............... H02P 25/08
   318/376
2016/0094180 A1\* 3/2016 Ajima .................. B60T 13/745
   417/423.1

OTHER PUBLICATIONS

"International Search Report (Form PCT/ISA/210) of PCT/JP2018/042601," dated Feb. 12, 2019, with English translation thereof, pp. 1-2.

\* cited by examiner

MOTOR CONTROL DEVICE

CROSS-REFERENCE TO RELATED APPLICATION

This application is a 371 application of the International PCT application serial no. PCT/JP2018/042601, filed on Nov. 19, 2018, which claims the priority benefit of Japan Patent Application No. 2017-235526, filed on Dec. 7, 2017. The entirety of each of the abovementioned patent applications is hereby incorporated by reference herein and made a part of this specification.

BACKGROUND

Technical Field

The invention relates to a motor control device.

Description of Related Art

There is a conventional motor control device which, when using a switched reluctance motor (hereinafter, SR motor) as the motor, appropriately switches between drive control for generating drive torque and brake control for generating braking torque for the SR motor so as to adjust the speed of the motor.

RELATED ART

Patent Document

[Patent Document 1] Japanese Laid-Open No. 2002-058272

SUMMARY

Problems to be Solved

However, when the motor control device switches from brake control to drive control, for example, if drive control is started with a regenerative current remaining in the SR motor, not only the regenerative current cannot be recovered, an excessive current may also be generated in the SR motor. In addition, when the motor control device switches from drive control to brake control, the excitation current may increase and the regenerative current may become excessive.

In view of such circumstances, the invention provides a motor control device that suppresses generation of an excessive current in the SR motor when switching between drive control and brake control.

Means for Solving the Problems

According to one embodiment of the invention, a motor control device is provided for controlling rotation of a multiphase SR motor. The motor control device includes a control unit controlling a rotational speed of the SR motor while switching between drive control for generating drive torque in the SR motor and brake control for generating braking torque in the SR motor. The control unit switches from one of the drive control and the brake control to the other under a condition that a current flowing through a winding wire of an energized phase is less than a prescribed value.

According to one embodiment of the invention, in the above-described motor control device, when switching from one of the drive control and the brake control to the other, the control unit provides a non-energized section where an excitation current does not flow through the winding wire corresponding to the energized phase to reduce the current flowing through the winding wire of the energized phase to be less than the prescribed value.

According to one embodiment of the invention, in the above-described motor control device, when switching from one of the drive control and the brake control to the other, the control unit does not provide the non-energized section if the rotational speed of the SR motor is less than a prescribed value.

According to one embodiment of the invention, in the above-described motor control device, the SR motor includes: a stator having a plurality of first salient poles around which winding wires are wound; and a rotor having a plurality of second salient poles. The control unit enables the first salient pole to magnetically attract the second salient pole by selectively energizing the winding wires, to generate the drive torque or the braking torque in the rotor.

According to one embodiment of the invention, in the above-described motor control device, when switching from the brake control to the drive control, the control unit does not perform magnetic attraction for generating the drive torque at least for a second salient pole next to a current second salient pole, as the non-energized section.

According to one embodiment of the invention, in the above-described motor control device, when switching from the drive control to the brake control, the control unit does not perform magnetic attraction for generating the braking torque at least for the current second salient pole, as the non-energized section.

Effects

As described above, according to the invention, it is possible to suppress the generation of an excessive current in the SR motor when switching between drive control and brake control.

DESCRIPTION OF THE EMBODIMENTS

Figure 1:
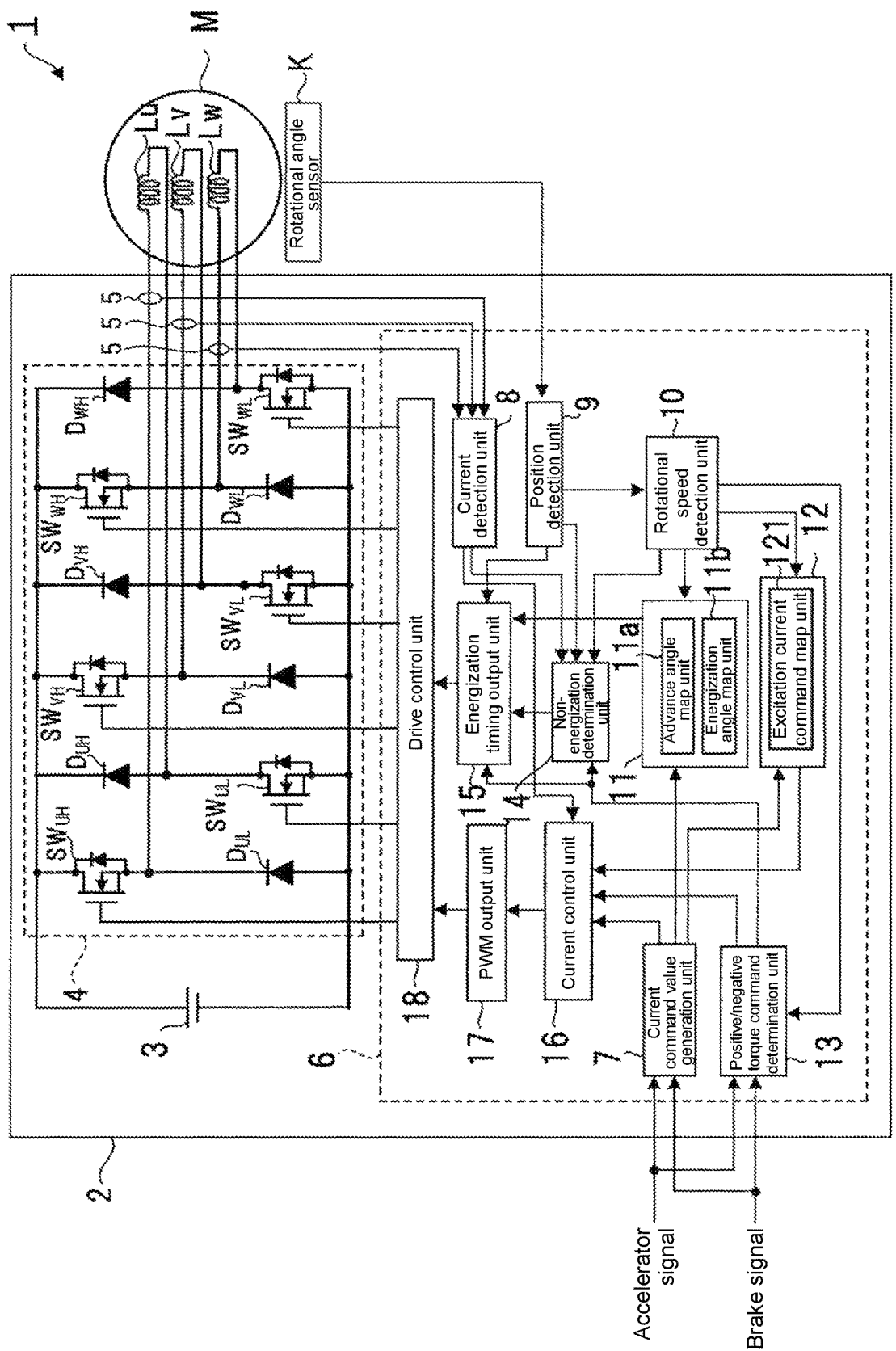
FIG. 1 is a diagram showing an example of a schematic configuration of a motor system 1 including a motor control device 2 according to an embodiment of the invention.

Hereinafter, the invention will be described through embodiments of the invention, but the following embodiments are not intended to limit the invention according to the claims. In addition, all the combinations of the features described in the embodiments are not necessarily essential to the solution of the invention. In the drawings, the same or similar parts may be denoted by the same reference numerals and redundant descriptions may be omitted. Furthermore, the shapes and sizes of the elements in the drawings may be exaggerated for clearer illustration.

Hereinafter, a motor control device 2 according to an embodiment of the invention will be described with reference to the drawings.

FIG. 1 is a diagram showing an example of a schematic configuration of a motor system 1 including the motor control device 2 according to an embodiment of the invention.

As shown in FIG. 1, the motor system 1 includes the motor control device 2, a multiphase switched reluctance motor (SR motor) M, and a rotational angle sensor K. The motor control device 2 of the present embodiment rotationally drives the three-phase SR motor M. The SR motor M is used, for example, as the motor for driving wheels of a vehicle.

Figure 2:
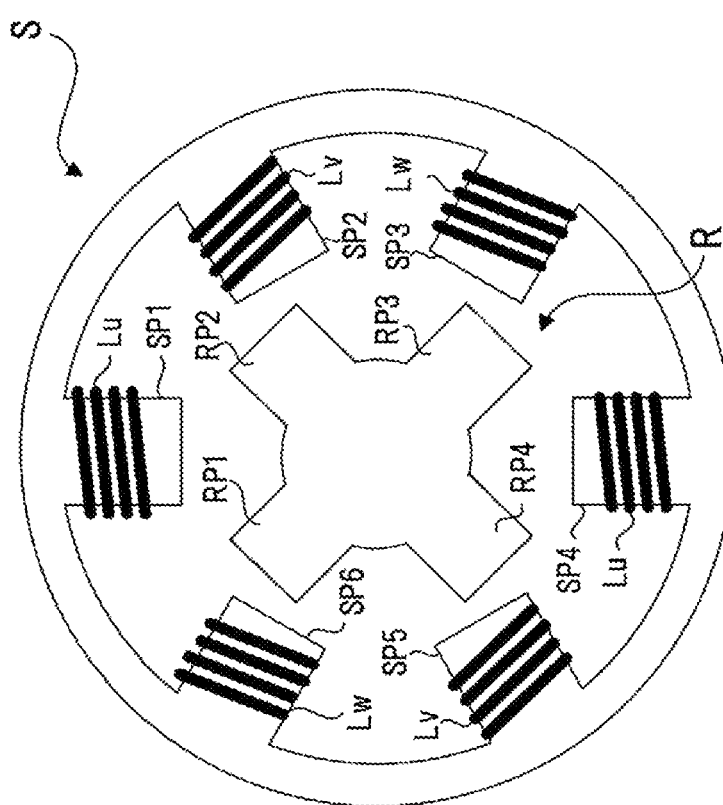
FIG. 2 is a diagram showing an example of a schematic configuration of an SR motor M to be controlled by the motor control device 2 according to an embodiment of the invention.

FIG. 2 is a diagram showing an example of a schematic configuration of the SR motor M to be controlled by the motor control device 2 according to an embodiment of the invention. As shown in FIG. 2, the SR motor M includes a rotor R and a stator S.

The rotor R includes four salient poles RP1 to RP4 arranged at equal intervals on the circumference. The salient poles RP1 to RP4 of the rotor R are examples of the "second salient poles" of the invention. The stator S is provided to surround the rotor R. In addition, the stator S has six salient poles SP1 to SP6 toward the rotor R on the inner side. The salient poles SP1 to SP6 of the stator S are examples of the "first salient poles" of the invention.

A winding wire is wound around each of the salient poles SP1 to SP6 of the stator S. Specifically, winding wires Lu of a U-phase (hereinafter, referred to as "U-phase winding wire") are wound around the salient pole SP1 and the salient pole SP4. Winding wires Lv of a V-phase (hereinafter, referred to as "V-phase winding wire") are wound around the salient pole SP2 and the salient pole SP5. Winding wires Lw of a W-phase (hereinafter, referred to as "W-phase winding wire") are wound around the salient pole SP3 and the salient pole SP6.

The rotational angle sensor K is provided on the SR motor M. The rotational angle sensor K is a detection device for detecting the rotational angle of the rotor R of the SR motor M and is, for example, a resolver. The rotational angle sensor K outputs an output signal corresponding to the detected rotational angle to the motor control device 2.

The motor control device 2 selectively energizes the U-phase winding wires Lu, the V-phase winding wires Lv, and the W-phase winding wires Lw for the salient poles SP1 to SP6 of the stator S to magnetically attract the salient poles RP1 to RP4 of the rotor R so as to generate positive torque or negative torque in the rotor R. Thereby, the motor control device 2 adjusts the rotational speed of the SR motor M. In the following description, generating positive torque (drive torque) in the rotor R is referred to as drive control, and generating negative torque (braking torque) in the rotor R is referred to as brake control. As described above, the motor control device 2 controls the rotational speed of the SR motor M while alternately switching the control mode for controlling the rotation of the SR motor M between drive control and brake control.

Returning to FIG. 1, a specific configuration of the motor control device 2 will be described hereinafter.

The motor control device 2 includes a power supply unit 3, an inverter 4, a current sensor 5, and a control unit 6.

The power supply unit 3 is, for example, a battery mounted on a vehicle. A secondary battery such as a nickel hydrogen battery and a lithium ion battery can be used as the power supply unit 3. Further, an electric double layer capacitor can also be used in place of the secondary battery.

The inverter 4 is connected to the U-phase winding wires Lu, the V-phase winding wires Lv, and the W-phase winding wires Lw respectively.

The inverter 4 includes a plurality of switching elements SW and a plurality of diodes D. The present embodiment illustrates a case where the switching element SW is an n-type channel FET (field effective transistor), but the invention is not limited thereto. The switching element SW may also be, for example, an IGBT (insulated gate bipolar transistor) and a BJT (bipolar junction transistor).

The plurality of switching elements SW include six switching elements $SW_{UH}$, $SW_{UL}$, $SW_{VH}$, $SW_{VL}$, $SW_{WH}$, and $SW_{WL}$, connected in a three-phase bridge connection of a U phase, a V phase, and a W phase. The plurality of diodes D include six diodes $D_{UH}$, $D_{UL}$, $D_{VH}$, $D_{VL}$, $D_{WH}$, and $D_{WL}$.

The drain of the switching element $SW_{UX}$ is connected to the positive terminal of the power supply unit 3, and the source is connected to the cathode of the diode $D_{UL}$. The anode of the diode $D_{UL}$ is connected to the negative terminal of the power supply unit 3. The cathode of the diode $D_{UH}$ is connected to the positive terminal of the power supply unit 3, and the anode is connected to the drain of the switching element $SW_{UL}$. The source of the switching element $SW_{UL}$ is connected to the negative terminal of the power supply unit 3.

The drain of the switching element $SW_{VH}$ is connected to the positive terminal of the power supply unit 3, and the source is connected to the cathode of the diode $D_{VL}$. The anode of the diode $D_{VL}$ is connected to the negative terminal of the power supply unit 3. The cathode of the diode $D_{VH}$ is connected to the positive terminal of the power supply unit 3, and the anode is connected to the drain of the switching element $SW_{VL}$. The source of the switching element $SW_{VL}$ is connected to the negative terminal of the power supply unit 3.

The drain of the switching element $SW_{WH}$ is connected to the positive terminal of the power supply unit 3, and the source is connected to the cathode of the diode $D_{WL}$. The anode of the diode $D_{WL}$ is connected to the negative terminal of the power supply unit 3. The cathode of the diode $D_{WH}$ is connected to the positive terminal of the power supply unit 3, and the anode is connected to the drain of the switching element $SW_{WL}$. The source of the switching element $SW_{WL}$ is connected to the negative terminal of the power supply unit 3.

One end of the U-phase winding wire Lu of the SR motor M is connected to a connection point between the switching element $SW_{UH}$ and the diode $D_{UL}$, and the other end of the U-phase winding wire Lu is connected to a connection point between the switching element $SW_{UL}$ and the diode $D_{UH}$. One end of the V-phase winding wire Lv of the SR motor M is connected to a connection point between the switching element $SW_{VH}$ and the diode $D_{VL}$, and the other end of the V-phase winding wire Lv is connected to a connection point between the switching element $SW_{VL}$ and the diode $D_{VH}$.

One end of the W-phase winding wire Lw of the SR motor M is connected to a connection point between the switching element $SW_{WH}$ and the diode $D_{WL}$, and the other end of the W-phase winding wire Lw is connected to a connection point between the switching element $SW_{WL}$ and the diode $D_{WH}$.

The current sensor 5 detects currents (hereinafter, referred to as "phase current") respectively flowing through the U-phase winding wires Lu, the V-phase winding wires Lv, and the W-phase winding wires Lw of the SR motor M, and outputs them to the control unit 6.

The control unit 6 switches each switching element SW to the on state or the off state by transmitting a control signal to the gate of each switching element SW. Therefore, the current from the power supply unit 3 is supplied to each of the U-phase winding wires Lu, the V-phase winding wires Lv, and the W-phase winding wires Lw. That is, the control unit 6 switches the energization of the winding wire corresponding to each phase of the SR motor M, thereby generating positive torque or negative torque in the SR motor M, and rotationally driving the SR motor M while adjusting the rotational speed of the SR motor M. Hereinafter, a configuration of the control unit 6 according to the embodiment of the invention will be described.

The control unit 6 includes a current command value generation unit 7, a current detection unit 8, a position detection unit 9, a rotational speed detection unit 10, an advance angle/energization angle setting unit 11, an excitation current command setting unit 12, a positive/negative torque command determination unit 13, a non-energization determination unit 14, an energization timing output unit 15, a current control unit 16, a PWM output unit 17, and a drive control unit 18.

The current command value generation unit 7 obtains a target value (hereinafter, referred to as "current command value") of the current flowing through each of the U-phase winding wires Lu, the V-phase winding wires Lv, and the W-phase winding wires Lw of the SR motor M according to an accelerator signal indicating an operation amount (a stepping force amount) of an accelerator pedal of the vehicle or a brake signal indicating an operation amount (a stepping force amount) of a brake pedal, for example. Then, the current command value generation unit 7 outputs the obtained current command value to the advance angle/ energization angle setting unit 11, the excitation current command setting unit 12, and the current control unit 16. For example, the current command value generation unit 7 includes an accelerator current command value table in which the operation amount of the accelerator pedal and the current command value are associated with each other, and a brake current command value table in which the operation amount of the brake pedal and the current command value are associated with each other. Then, the current command value generation unit 7 obtains the current command value corresponding to the operation amount of the accelerator pedal indicated by the accelerator signal or the operation amount of the brake pedal indicated by the brake signal from the accelerator current command value table or the brake current command value table so as to calculate the current command value.

The current detection unit 8 detects a phase current value output by the current sensor 5 and flowing through each of the U-phase winding wires Lu, the V-phase winding wires Lv, and the W-phase winding wires Lw of the SR motor M. Then, the current detection unit 8 outputs the detected phase current value of each phase to the non-energization determination unit 14 and the current control unit 16. For example, the current detection unit 8 detects the phase current being supplied to the SR motor M based on a detection signal of each phase current output from each current sensor 5, and outputs the phase current value to the current control unit 16.

The position detection unit 9 detects a rotational angle of the rotor R (a rotational position of the rotor R) based on a signal output by the rotational angle sensor K, and outputs the detection result to the rotational speed detection unit 10, the non-energization determination unit 14, and the energization timing output unit 15.

The rotational speed detection unit 10 detects a change amount per unit time of a signal indicating the rotational angle of the rotor R output by the position detection unit 9, and calculates the rotational speed (number of revolutions) of the rotor R from the detected change amount. Then, the rotational speed detection unit 10 outputs the calculated rotational speed to the advance angle/energization angle setting unit 11, the excitation current command setting unit 12, the positive/negative torque command determination unit 13, and the non-energization determination unit 14.

The advance angle/energization angle setting unit 11 outputs the current command value output from the current command value generation unit 7, and an advance angle and an energization angle corresponding to the rotational speed output from the rotational speed detection unit 10 to the energization timing output unit 15. For example, the advance angle/energization angle setting unit 11 includes an advance angle map unit 11a and an energization angle map unit 11b.

The advance angle map unit 11a is a map in which the value of the advance angle is associated with each combination of the current command value and the rotational speed of the rotor R. Here, the advance angle represents an angle at which the energization angle is changed to the advance angle side from a prescribed position that makes an energization start phase and an energization end phase for each winding wire of each phase of the SR motor M corresponding to the inductance change of each phase (for example, an increase start phase and a decrease start phase of the inductance, etc.). The advance angle tends to increase with an increase in the current command value and the number of revolutions. For example, the advance angle map unit 11a is set from a simulation, a measurement result obtained by an actual machine, etc.

The energization angle map unit 11b is a map in which the value of the energization angle is associated with each combination of the current command value and the rotational speed of the rotor R. Here, the energization angle is associated with each of the U-phase winding wires Lu, the V-phase winding wires Lv, and the W-phase winding wires Lw of the SR motor M. For example, the energization angle map unit 11b is set from a simulation, a measurement result obtained by an actual machine, etc.

Therefore, the advance angle/energization angle setting unit 11 determines the advance angle from the advance angle map unit 11a based on the current command value output by the current command value generation unit 7 and the rotational speed output by the rotational speed detection unit 10. Then, the advance angle/energization angle setting unit 11 outputs the determined advance angle to the energization timing output unit 15. In addition, the advance angle/ energization angle setting unit 11 determines the energization angle from the energization angle map unit 11b based on the current command value output by the current command value generation unit 7 and the rotational speed output by the rotational speed detection unit 10. Then, the advance angle/ energization angle setting unit 11 outputs the determined energization angle to the energization timing output unit 15.

The excitation current command setting unit 12 includes an excitation current command map unit 121. The excitation current command map unit 121 is a map that stores the rotational speed of the SR motor M when regenerative control of the SR motor M is performed, and a regenerative control current command value, which is a target value of the current when the SR motor M is regeneratively controlled. In the excitation current command map unit 121, for example, when the operation amount of the brake pedal increases and the rotational speed tends to decrease, the regenerative control current command value changes to an increasing tendency. For example, the regenerative control current command value is calculated using a simulation with a characteristic value of the SR motor M, or is determined in advance with an actually measured value of the SR motor M.

The excitation current command setting unit 12 obtains the current command value from the current command value generation unit 7 and the rotational speed of the SR motor M from the rotational speed detection unit 10, and selects the regenerative control current command value corresponding to the obtained current command value and rotational speed from the read excitation current command map unit 121. Then, the excitation current command setting unit 12 outputs the selected regenerative control current command value to the current control unit 16.

The positive/negative torque command determination unit 13 determines whether to reverse the torque for the SR motor M based on the accelerator signal or the brake signal. For example, the positive/negative torque command determination unit 13 determines to reverse the torque for the SR motor M when the accelerator signal disappears or when the brake signal is obtained. In this case, the torque is reversed from positive torque to negative torque. In addition, the positive/negative torque command determination unit 13 determines to reverse the torque for the SR motor M when the brake signal disappears and the accelerator signal is obtained. In this case, the torque is reversed from negative torque to positive torque. The positive/negative torque command determination unit 13 outputs a torque reversal command indicating to reverse the torque for the SR motor M to the non-energization determination unit 14, the energization timing output unit 15, and the current control unit 16.

In the case where the torque reversal command has been obtained from the positive/negative torque command determination unit 13, if it is determined that the current flowing through the winding wire of the energized phase is equal to or greater than a prescribed value, the non-energization determination unit 14 determines to execute a non-energization process. Here, the non-energization process of the present embodiment is a process in which the excitation current does not flow through the winding wire corresponding to the energized phase.

Here, when it is determined that the current (phase current) flowing through the winding wire of the energized phase is less than the prescribed value, it may not be necessary to actually measure the phase current. For example, the case where the phase current is determined to be less than the prescribed value refers to a case where at least one of the following two conditions is satisfied:
(1) when the phase current obtained from the position detection unit 9 is equal to or greater than a prescribed threshold (hereinafter, referred to as "current threshold"); and (2) when the rotational speed obtained from the rotational speed detection unit 10 is equal to or greater than a prescribed threshold (hereinafter, referred to as "rotational speed threshold").

When determining to execute the non-energization process, the non-energization determination unit 14 outputs a non-energization process command indicating execution of the non-energization process to the energization timing output unit 15. Further, in the case where the torque reversal command has been obtained from the positive/negative torque command determination unit 13, if the current flowing through the winding wire of the energized phase is less than the prescribed value, the non-energization determination unit 14 determines not to execute the non-energization process, and outputs a mode switching signal, indicating switching of the control mode for controlling the rotation of the SR motor M, to the energization timing output unit 15.

The energization timing output unit 15 obtains the rotational position of the rotor R output from the position detection unit 9, and the advance angle and the energization angle output from the advance angle/energization angle setting unit 11. Then, the energization timing output unit 15 determines an energization timing for energizing the U-phase winding wires Lu, the V-phase winding wires Lv, and the W-phase winding wires Lw based on the rotational position of the rotor R, the advance angle and the energization angle that are obtained.

For example, in a drive control mode for drive-controlling the SR motor M, the energization timing output unit 15 determines a positive torque energization start timing, which is a timing for generating positive torque, based on the obtained advance angle and energization angle. Then, when the obtained rotational position of the rotor R is a position corresponding to the positive torque energization start timing, the energization timing output unit 15 outputs a drive signal indicating to generate positive torque to the drive control unit 18.

Furthermore, in a brake control mode for brake-controlling the SR motor M, the energization timing output unit 15 determines a negative torque energization start timing, which is a timing for generating negative torque, based on the obtained advance angle and energization angle. Then, when the obtained rotational position of the rotor R is a position corresponding to the negative torque energization start timing, the energization timing output unit 15 outputs a brake signal indicating to generate negative torque to the drive control unit 18.

When shifting from the drive control mode to the brake control mode or when shifting from the brake control mode to the drive control mode, the energization timing output unit 15 temporarily stops the output of the drive signal and the brake signal. That is, the energization timing output unit 15 temporarily stops the output of the drive signal and the brake signal when the torque reversal command is obtained. Then, in the case of the drive control mode, the energization timing output unit 15 shifts to the brake control mode when the mode switching signal is obtained. On the other hand, in the case of the brake control mode, the energization timing output unit 15 shifts to the drive control mode when the mode switching signal is obtained.

Here, in the case of shifting from one of the drive control mode and the brake control mode to the other, when the non-energization process command is obtained from the non-energization determination unit 14, the energization timing output unit 15 provides a non-energized section where the drive signal and the brake signal are not output during a predetermined period even if the positive torque energization start timing or the negative torque energization start timing comes.

For example, in the case of shifting from the brake control mode to the drive control mode, the energization timing output unit 15 stops the output of the drive signal for a predetermined period when the non-energization process command is obtained. The predetermined period in this case can be set to any value if at least the period during which no magnetic attraction force is generated for the salient pole RP next to the current salient pole RP can be secured.

Further, in the case of shifting from the drive control mode to the brake control mode, the energization timing output unit 15 stops the output of the brake signal for a predetermined period when the non-energization process command is obtained. The predetermined period in this case can be set to any value if at least the period during which the magnetic attraction force of negative torque is not generated for the current salient pole RP can be secured.

The current control unit 16 determines whether the control mode for the SR motor M is the drive control mode or the brake control mode based on the torque reversal command from the positive/negative torque command determination unit 13. When the control mode for the SR motor M is the drive control mode, the current control unit 16 calculates a deviation (hereinafter, referred to as "drive current difference value") between the current command value supplied from the current command value generation unit 7 and the phase current value supplied from the current detection unit 8. Then, the current control unit 16 outputs the calculated drive current difference value to the PWM output unit 17. In addition, when the control mode for the SR motor M is the brake control mode, the current control unit 16 calculates a deviation (hereinafter, referred to as "brake current difference value") between the regenerative control current command value supplied from the excitation current command setting unit 12 and the phase current value supplied from the current detection unit 8. Then, the current control unit 16 outputs the calculated brake current difference value to the PWM output unit 17.

The PWM output unit 17 calculates a duty ratio based on the drive current difference value or the brake current difference value using generally known PI (proportional integral) control or PID (proportional integral derivative) control. Then, the PWM output unit 17 outputs the calculated duty ratio to the drive control unit 18.

The drive control unit 18 generates a first control signal based on the drive signal output from the energization timing output unit 15 and the duty ratio output from the PWM output unit 17. Then, the drive control unit 18 drive-controls the SR motor M by transmitting the generated first control signal to the gate of each switching element SW in accordance with a plurality of preset energization patterns.

Further, the drive control unit 18 generates a second control signal based on the brake signal output from the energization timing output unit 15 and the duty ratio output from the PWM output unit 17. Then, the drive control unit 18 brake-controls the SR motor M by transmitting the generated second control signal to the gate of each switching element SW in accordance with a plurality of preset energization patterns.

Figure 3:
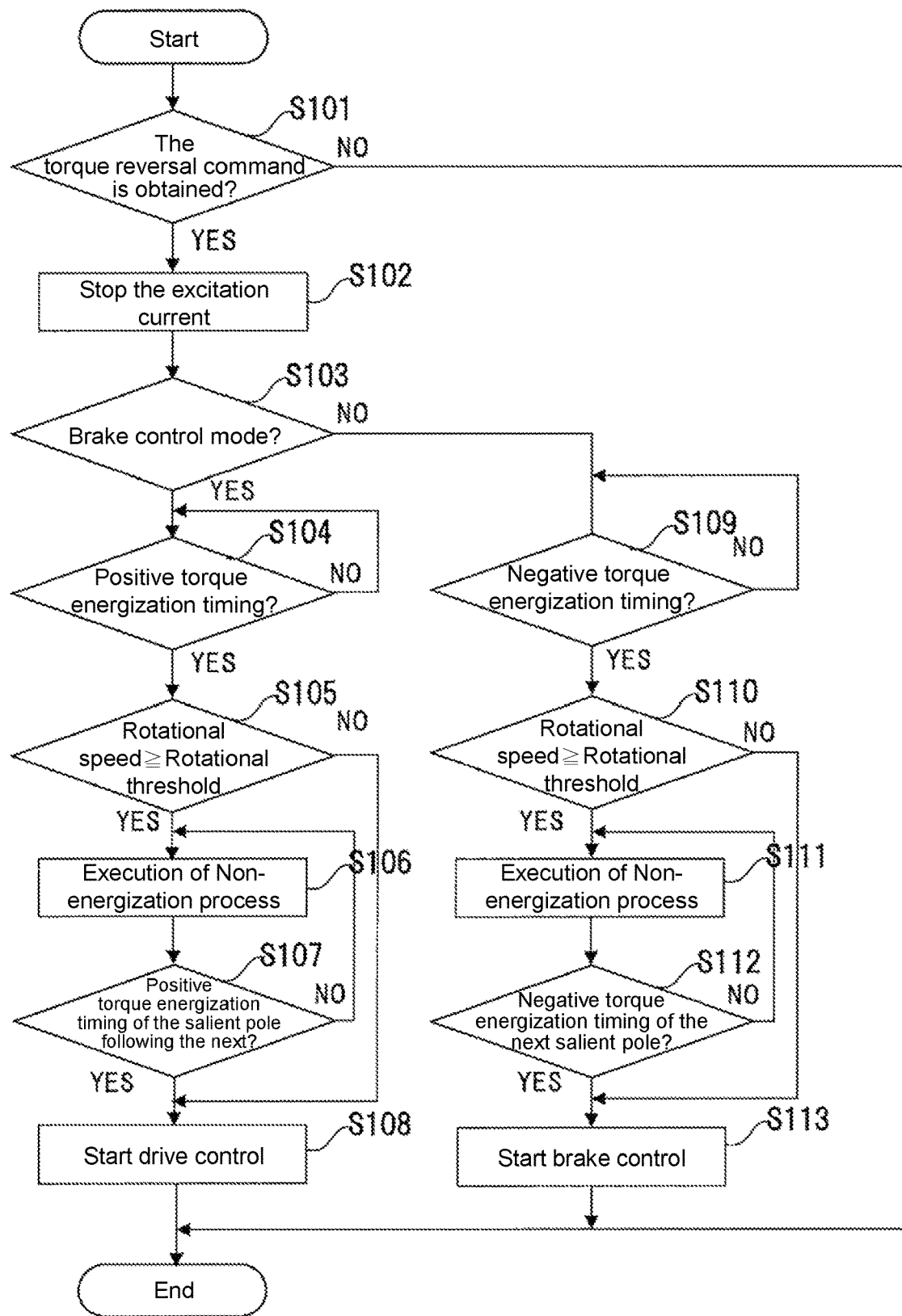
FIG. 3 is a diagram showing a flow of an operation of the motor control device 2 according to an embodiment of the invention.

Next, a flow of the operation of the motor control device 2 according to the present embodiment will be described. FIG. 3 is a diagram showing the flow of the operation of the motor control device 2 according to an embodiment of the invention.

The energization timing output unit 15 determines whether the torque reversal command is obtained from the positive/negative torque command determination unit 13 (Step S101). The energization timing output unit 15 stops the output of the drive signal or the brake signal if the torque reversal command is obtained from the positive/negative torque command determination unit 13 (Step S102). Thus, the drive control unit 18 stops the output of the first control signal or the second control signal. Therefore, if the excitation current is supplied to the SR motor M, the supply of the excitation current is stopped.

In addition, the energization timing output unit 15 does not stop the output of the drive signal or the brake signal if the torque reversal command is not obtained from the positive/negative torque command determination unit 13. Therefore, if the excitation current is supplied to the SR motor M, the supply of the excitation current is continued.

The energization timing output unit 15 determines whether the current control mode is the brake control mode (Step S103). If it is determined that the current control mode is the brake control mode, the energization timing output unit 15 determines whether the rotational position of the rotor R is a position corresponding to the positive torque energization start timing (Step S104).

If it is determined that the rotational position of the rotor R is a position corresponding to the positive torque energization start timing, the energization timing output unit 15 determines whether the rotational speed obtained from the rotational speed detection unit 10 is equal to or greater than the rotational speed threshold (Step S105).

If it is determined that the rotational speed obtained from the rotational speed detection unit 10 is equal to or greater than the rotational speed threshold, the energization timing output unit 15 executes the non-energization process (Step S106). That is, the energization timing output unit 15 does not generate a magnetic attraction force at least for the salient pole RP next to the salient pole RP of the rotor R that has just been magnetically attracted. For example, if the salient pole RP1 of the rotor R has just been magnetically attracted, the salient pole RP2 which is the next salient pole is not magnetically attracted. In other words, when switching the control for the SR motor M from brake control to drive control, the control unit 6 does not supply the excitation current to the winding wire of the energized phase even if the first positive torque energization start timing has come after the acquisition of the torque reversal signal.

The energization timing output unit 15 determines whether the second positive torque energization start timing has come after the acquisition of the torque reversal signal (Step S107). The energization timing output unit 15 outputs the drive signal to the drive control unit 18 if the second positive torque energization start timing has come after the acquisition of the torque reversal signal. Thereby, the control unit 6 shifts from the brake control mode to the drive control mode, and starts drive control for the SR motor M (Step S108). However, if the second positive torque energization start timing does not come after the acquisition of the torque reversal signal, the energization timing output unit 15 continues the process of Step S106 until the second positive torque energization start timing comes.

In Step S103, if it is determined that the current control mode is not the brake control mode, the energization timing output unit 15 determines whether the rotational position of the rotor R is a position corresponding to the negative torque energization start timing (Step S109).

If it is determined that the rotational position of the rotor R is a position corresponding to the negative torque energization start timing, the energization timing output unit 15 determines whether the rotational speed obtained from the rotational speed detection unit 10 is equal to or greater than the rotational speed threshold (Step S110).

If it is determined that the rotational speed obtained from the rotational speed detection unit 10 is equal to or greater than the rotational speed threshold, the energization timing output unit 15 executes the non-energization process (Step S111). That is, the energization timing output unit 15 does not generate a magnetic attraction force of negative torque at least for the current salient pole RP. For example, if a magnetic attraction force of positive torque has just been generated for the salient pole RP1 of the rotor R, a magnetic attraction force of negative torque is not generated for the salient pole RP1. In other words, when switching the control for the SR motor M from drive control to brake control, the control unit 6 does not supply the excitation current to the winding wire of the energized phase even if the first negative torque energization start timing has come after the acquisition of the torque reversal signal.

The energization timing output unit 15 determines whether the second negative torque energization start timing has come after the acquisition of the torque reversal signal (Step S112). The energization timing output unit 15 outputs the brake signal to the drive control unit 18 if the second negative torque energization start timing has come after the acquisition of the torque reversal signal. Thereby, the control unit 6 shifts from the drive control mode to the brake control mode, and starts brake control for the SR motor M (Step S113). However, if the second negative torque energization start timing does not come after the acquisition of the torque reversal signal, the energization timing output unit 15 continues the process of Step S111 until the negative torque energization start timing comes.

Next, the effect of the present embodiment will be described with reference to FIG. 4 to FIG. 7. Although the following description relates to a case where the energized phase is the U phase, the same applies to the V phase and the W phase.

(Switch from Brake Control to Drive Control)

Figure 4:
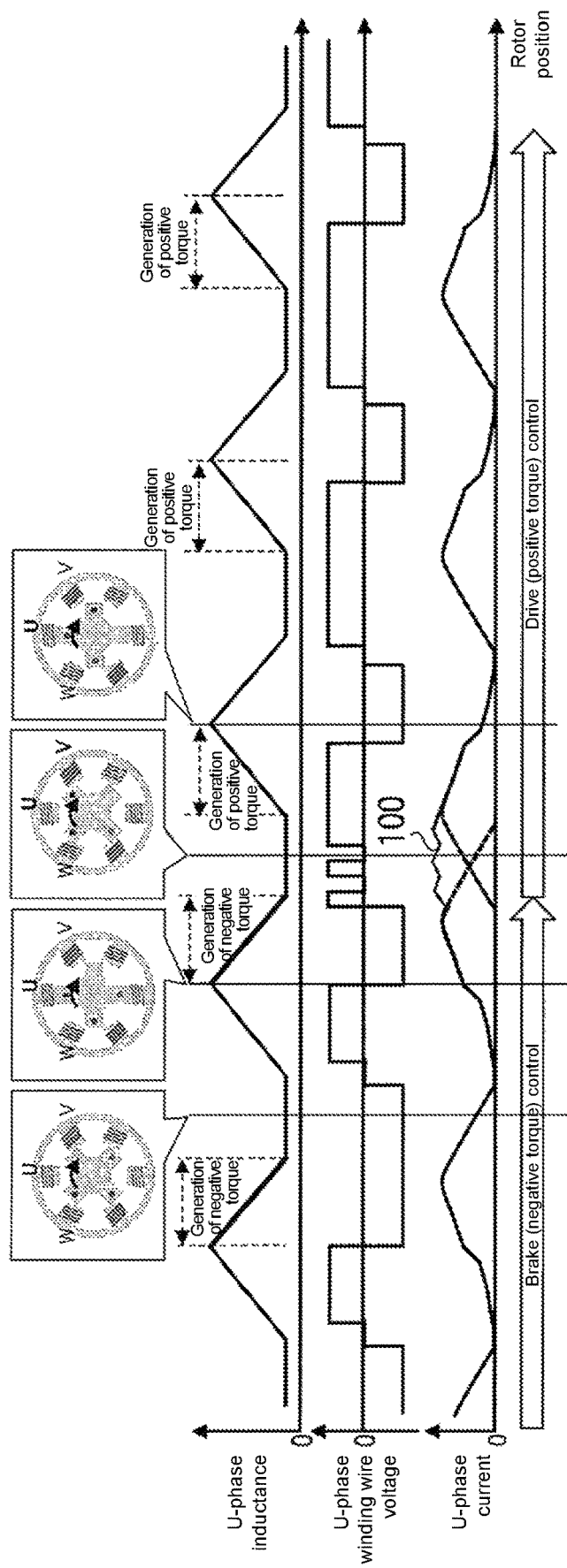
FIG. 4 is a diagram showing a timing chart when switching from brake control to drive control according to the conventional art.
Figure 5:
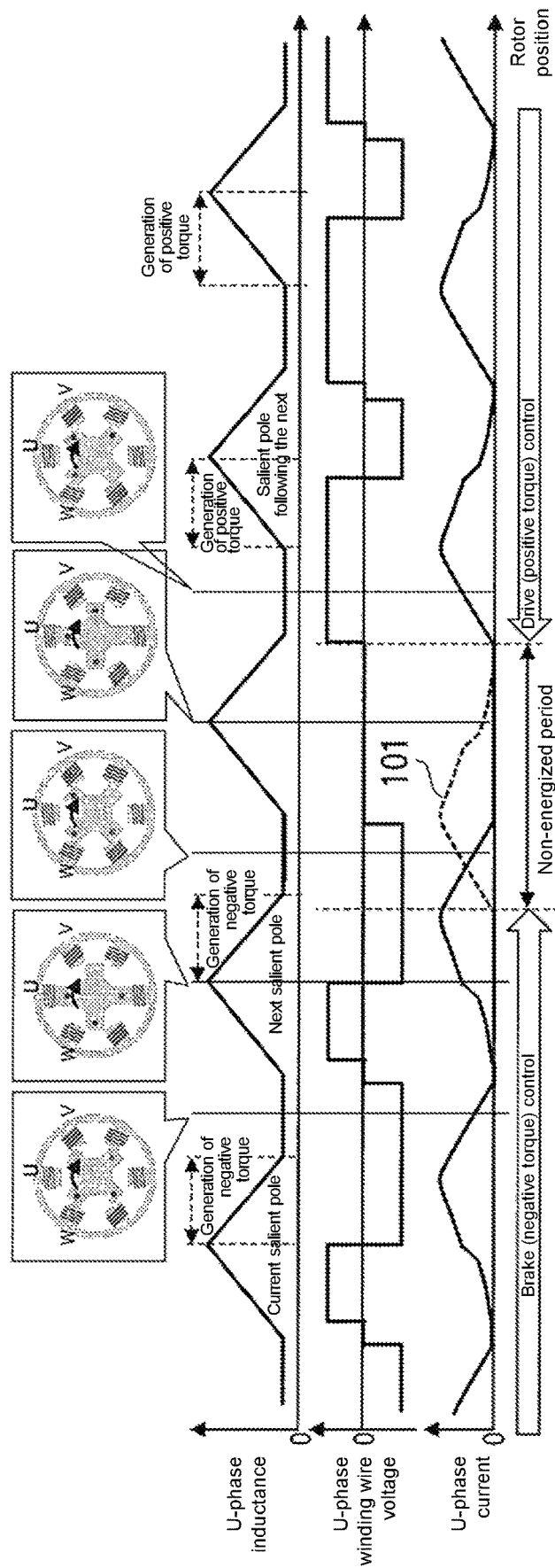
FIG. 5 is a diagram showing a timing chart when switching from brake control to drive control according to an embodiment of the invention.

First, the effect of switching from brake control to drive control according to the present embodiment will be described with reference to FIG. 4 and FIG. 5. FIG. 4 is a diagram showing a timing chart when switching from brake control to drive control according to the conventional art. FIG. 5 is a diagram showing a timing chart when switching from brake control to drive control according to an embodiment of the invention.

As shown in FIG. 4, the conventional motor control device switches from brake control to drive control at a time when the accelerator signal is input. Therefore, for the conventional motor control device, if the regenerative current remains in the SR motor when the accelerator signal is input, the regenerative current and the excitation current may overlap because of the start of drive control, and an excessive current 100 may be generated in the SR motor.

In contrast thereto, as shown in FIG. 5, when the accelerator signal is input to switch from brake control to drive control, the motor control device 2 of the present embodiment provides the non-energized period instead of performing the switch immediately. For example, when switching from brake control to drive control, the motor control device 2 provides the non-energized section where the excitation current 101 does not flow, and positive torque is not generated at least for the salient pole RP next to the current salient pole RP. Thereby, the motor control device 2 can separate the brake control state and the drive control state, and can eliminate the overlap between the regenerative current and the excitation current 101. Therefore, the motor control device 2 can suppress the generation of an excessive current in the SR motor M.

(Switch from Drive Control to Brake Control)

Figure 6:
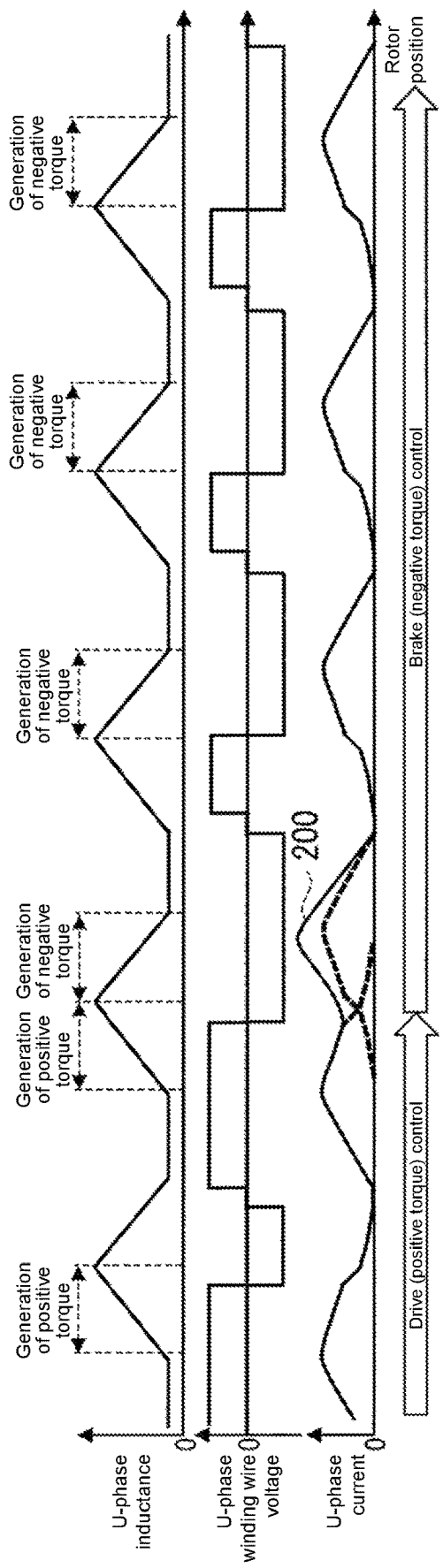
FIG. 6 is a diagram showing a timing chart when switching from drive control to brake control according to the conventional art.
Figure 7:
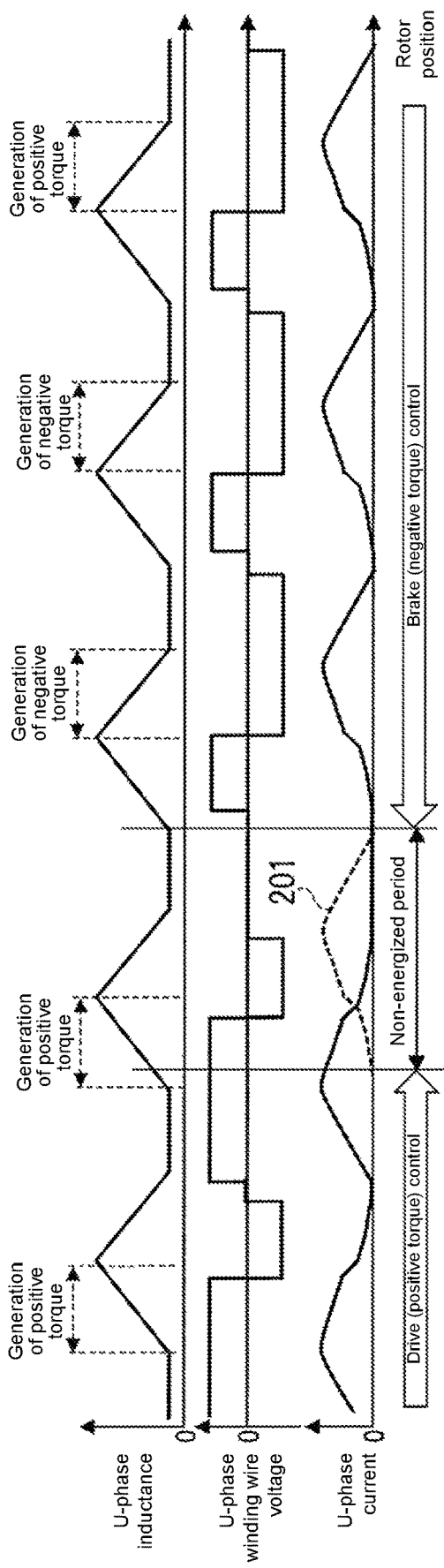
FIG. 7 is a diagram showing a timing chart when switching from drive control to brake control according to an embodiment of the invention.

Next, the effect of switching from drive control to brake control according to the present embodiment will be described with reference to FIG. 6 and FIG. 7. FIG. 6 is a diagram showing a timing chart when switching from drive control to brake control according to the conventional art. FIG. 7 is a diagram showing a timing chart when switching from drive control to brake control according to an embodiment of the invention.

As shown in FIG. 6, the conventional motor control device switches from drive control to brake control at a time when the brake signal is input or when the accelerator signal disappears. Therefore, for the conventional motor control device, when switching from drive control to brake control, the excitation current may increase and the regenerative current 200 may become excessive.

In contrast thereto, as shown in FIG. 7, when switching from drive control to brake control because of the input of the brake signal or the disappearance of the accelerator signal, the motor control device 2 of the present embodiment provides the non-energized period instead of performing the switch immediately. For example, when switching from drive control to brake control, the motor control device 2 provides the non-energized section where the excitation current 201 does not flow, and negative torque is not generated at least for the current salient pole RP. Thereby, the motor control device 2 can separate the drive control state and the brake control state, and can eliminate the overlap between the regenerative current and the excitation current 201. Therefore, the motor control device 2 prevents the regenerative current flowing through the SR motor M from becoming excessive, and as a result, it is possible to suppress the generation of an excessive current in the SR motor M.

However, the motor control device 2 does not necessarily provide the non-energized period when switching from brake control to drive control or when switching from drive control to brake control. For example, when switching from one of drive control and brake control to the other, if the phase current of the energized phase is low to a level that does not cause an excessive current, the motor control device 2 may switch from one of the aforementioned to the other without providing the non-energized period. That is, the motor control device 2 sets that the current (phase current) flowing through the winding wire of the energized phase is less than a prescribed value (for example, a state where almost no phase current flows) as a condition for switching from one of drive control and brake control to the other. Thereby, the motor control device 2 can suppress the generation of an excessive current in the SR motor when switching between drive control and brake control.

In other words, when switching from one of drive control and brake control to the other, the motor control device 2 provides the non-energized section where the excitation current does not flow through the winding wire corresponding to the energized phase, so as to reduce the current flowing through the winding wire of the energized phase to a value less than the prescribed value.

In addition, when switching from one of drive control and brake control to the other, the motor control device 2 may not provide the non-energized section if the rotational speed is less than the rotational speed threshold. The reason is that the overlap between the regenerative current and the excitation current, which occurs when switching from brake control to drive control or when switching from drive control to brake control, occurs if the advance angle and the energization angle are increased when the SR motor M is at a high rotational speed. In other words, when the rotational speed of the SR motor M is less than the rotational speed threshold, that is, when the rotational speed is low, it is not necessary to increase the advance angle/energization angle, and the current decay is fast. Thus, when the rotational speed of the SR motor M is less than the rotational speed threshold, the phase current does not exceed the prescribed value, so the regenerative current and the excitation current do not overlap. Therefore, when the rotational speed of the SR motor M is less than the rotational speed threshold, the motor control device 2 switches the control mode by energizing the SR motor M without providing the non-energized section. Thereby, the motor control device 2 can minimize the section of zero torque.

Although the embodiments of the invention have been described in detail above with reference to the drawings, the specific configuration is not limited to the embodiments and may include other designs, etc. without departing from the spirit of the invention.

In the above embodiment, in FIG. 3, the non-energized section is provided when the rotational speed is equal to or greater than the rotational threshold, but the invention is not limited thereto. For example, in Step S105 and Step S110 shown in FIG. 3, the energization timing output unit 15 may determine whether the phase current obtained from the position detection unit 9 is equal to or greater than the current threshold, and provide the non-energized section if the phase current is equal to or greater than the current threshold.

Each unit included in the control unit 6 of the present embodiment may be configured by installing a program for performing various processes related to the control of switching from one of drive control and brake control to the other, and enabling a computer to execute the program. That is, the control unit 6 may be configured by enabling the computer to execute the program for performing various processes for switching the control mode of the control unit 6, and enabling the computer to function as each unit included in the control unit 6. The computer has a CPU, a ROM, a RAM, various memories such as an EEPROM (registered trademark), a communication bus, and an interface, and the CPU reads out a processing program stored in the ROM as firmware in advance and sequentially executes the processing program to function as the control unit 6.

DESCRIPTIONS OF REFERENCE NUMERALS

2 Motor control device
3 Power supply unit
4 Inverter
5 Current sensor
6 Control unit
7 Current command value generation unit
8 Current detection unit
9 Position detection unit
10 Rotational speed detection unit
11 Advance angle/energization angle setting unit
12 Excitation current command setting unit
13 Positive/negative torque command determination unit
14 Non-energization determination unit
15 Energization timing output unit
16 Current control unit
17 PWM output unit
18 Drive control unit

What is claimed is:

1. A motor control device for controlling rotation of a multiphase SR motor, comprising:
a control unit controlling a rotational speed of the SR motor while switching between drive control for generating drive torque in the SR motor and brake control for generating braking torque in the SR motor,
wherein the control unit switches from one of the drive control and the brake control to the other under a condition that a current flowing through a winding wire of an energized phase is less than a prescribed value.

2. The motor control device according to claim 1, wherein when switching from one of the drive control and the brake control to the other, the control unit provides a non-energized section where an excitation current does not flow through the winding wire corresponding to the energized phase to reduce the current flowing through the winding wire of the energized phase to be less than the prescribed value.

3. The motor control device according to claim 2, wherein the SR motor comprises:
a stator comprising a plurality of first salient poles around which winding wires are wound; and
a rotor comprising a plurality of second salient poles,
wherein the control unit enables the first salient pole to magnetically attract the second salient pole by selectively energizing the winding wires, to generate the drive torque or the braking torque in the rotor.

4. The motor control device according to claim 3, wherein when switching from the brake control to the drive control, the control unit does not perform magnetic attraction for generating the drive torque at least for a second salient pole next to a current second salient pole, as the non-energized section.

5. The motor control device according to claim 4, wherein when switching from the drive control to the brake control, the control unit does not perform magnetic attraction for generating the braking torque at least for the current second salient pole, as the non-energized section.

6. The motor control device according to claim 3, wherein when switching from the drive control to the brake control, the control unit does not perform magnetic attraction for generating the braking torque at least for the current second salient pole, as the non-energized section.

7. The motor control device according to claim 2, wherein when switching from one of the drive control and the brake control to the other, the control unit does not provide the non-energized section if the rotational speed of the SR motor is less than a prescribed value.

8. The motor control device according to claim 7, wherein the SR motor comprises:
a stator comprising a plurality of first salient poles around which winding wires are wound; and
a rotor comprising a plurality of second salient poles,
wherein the control unit enables the first salient pole to magnetically attract the second salient pole by selectively energizing the winding wires, to generate the drive torque or the braking torque in the rotor.

9. The motor control device according to claim 8, wherein when switching from the brake control to the drive control, the control unit does not perform magnetic attraction for generating the drive torque at least for a second salient pole next to a current second salient pole, as the non-energized section.

10. The motor control device according to claim 9, wherein when switching from the drive control to the brake control, the control unit does not perform magnetic attraction for generating the braking torque at least for the current second salient pole, as the non-energized section.

11. The motor control device according to claim 8, wherein when switching from the drive control to the brake control, the control unit does not perform magnetic attraction for generating the braking torque at least for the current second salient pole, as the non-energized section.

12. The motor control device according to claim 1, wherein when switching from one of the drive control and the brake control to the other, the control unit does not provide the non-energized section if the rotational speed of the SR motor is less than a prescribed value.

13. The motor control device according to claim 12, wherein the SR motor comprises:
   a stator comprising a plurality of first salient poles around which winding wires are wound; and
   a rotor comprising a plurality of second salient poles,
   wherein the control unit enables the first salient pole to magnetically attract the second salient pole by selectively energizing the winding wires, to generate the drive torque or the braking torque in the rotor.

14. The motor control device according to claim 13, wherein when switching from the brake control to the drive control, the control unit does not perform magnetic attraction for generating the drive torque at least for a second salient pole next to a current second salient pole, as the non-energized section.

15. The motor control device according to claim 14, wherein when switching from the drive control to the brake control, the control unit does not perform magnetic attraction for generating the braking torque at least for the current second salient pole, as the non-energized section.

16. The motor control device according to claim 13, wherein when switching from the drive control to the brake control, the control unit does not perform magnetic attraction for generating the braking torque at least for the current second salient pole, as the non-energized section.

* * * * *